(12) United States Patent
Hochrein

(10) Patent No.: US 7,229,108 B2
(45) Date of Patent: Jun. 12, 2007

(54) AUTOMOBILE BODY PANEL PROTECTOR

(75) Inventor: Kirk Hochrein, 1064 Queen Street West, Unit A, Mississauga, Ontario (CA) L5H 4K3

(73) Assignee: Kirk Hochrein, Mississauga, Ontario (CA)

( * ) Notice: Subject to any disclaimer, the term of this patent is extended or adjusted under 35 U.S.C. 154(b) by 0 days.

(21) Appl. No.: 11/128,207

(22) Filed: May 13, 2005

(65) Prior Publication Data

US 2006/0197348 A1 Sep. 7, 2006

(30) Foreign Application Priority Data

Mar. 2, 2005 (CA) .................................. 2499231

(51) Int. Cl.
*B60J 11/06* (2006.01)
(52) U.S. Cl. .................. 293/128; 296/207; 296/136.02
(58) Field of Classification Search ........... 296/136.01, 296/136.02, 136.07, 207; 293/128; 280/770
See application file for complete search history.

(56) References Cited

U.S. PATENT DOCUMENTS

| | | | |
|---|---|---|---|
| 3,147,176 A | 9/1964 | Haslam | |
| 3,582,134 A | 6/1971 | Shaff | |
| 3,609,678 A * | 9/1971 | Fayling | 340/905 |
| 3,659,887 A | 5/1972 | Marquette | |
| 4,002,363 A | 1/1977 | James | |
| 4,014,583 A * | 3/1977 | Forbes | 293/128 |
| 4,294,478 A | 10/1981 | Marquette | |
| 4,498,697 A * | 2/1985 | McGlone et al. | 293/128 |
| 4,561,685 A * | 12/1985 | Fischer | 293/128 |
| 4,708,380 A * | 11/1987 | Cruz | 293/128 |
| 4,810,013 A * | 3/1989 | Spears | 293/128 |
| 5,129,695 A * | 7/1992 | Norman, II | 293/128 |
| 5,320,392 A * | 6/1994 | Hart | 293/128 |
| 6,254,170 B1 * | 7/2001 | Farmer et al. | 296/136.07 |
| 6,394,528 B2 * | 5/2002 | Hoenack | 296/136.01 |

* cited by examiner

*Primary Examiner*—D. Glenn Dayoan
*Assistant Examiner*—Greg Blankenship
(74) *Attorney, Agent, or Firm*—Dimock Stratton LLP

(57) ABSTRACT

A removable device for protecting parked automobile doors from dents, scuffs and scratches to its surface that may be caused by the doors of adjacent automobiles or other objects. The device consists of protective elements joined by a rope and mounted to the automobile by magnets. The device has a security tether which engages a locked door of an automobile to resist theft of the device.

6 Claims, 7 Drawing Sheets

AUTOMOBILE BODY PANEL PROTECTOR

FIELD OF THE INVENTION

This invention relates to automobile accessories. In particular, this invention relates to a removable device designed to protect an automobile body from dents, scuffs and scratches.

BACKGROUND OF THE INVENTION

Automobiles are/often damaged in parking lot situations, when the door of one automobile is opened and comes into contact with the side panel or door panel of an adjacent automobile. The damage can include scratches, dents, and chipped paint. Such damage will reduce the aesthetic appearance of the automobile and render it more vulnerable to corrosion, reducing its resale value. Damage to the exterior surface is expensive to repair and may even require repainting to fix properly.

The use of protector strips affixed to the side panels and door panels of an automobile is known. Such protective strips typically comprise a base with a resilient outer surface which projects slightly beyond the car body. This type of protector will prevent damage if the contact occurs against the protector, and is thus strategically positioned where another car's door is most likely to contact the side or door panel.

However, because the door protector strip increases the effective width of the car, the extent to which it can project beyond the car's door and side panels must necessarily be limited because it is permanently attached to the vehicle body, even when the car is in use. This commensurately reduces the chances that a neighbouring vehicle's car door will impact against the protective strip when it hits the side or door panel of the car.

It would accordingly be advantageous to provide a protective device for the side and door panels of an automobile which is removable, and therefore is used only when the vehicle is not in use. This would allow the protective device to project well beyond the side and door panels, to significantly improve the chances that a neighbouring vehicle's car door will impact against the protective strip.

SUMMARY OF THE INVENTION

The invention provides a protective device that can be temporarily attached to the door and/or side panels of an automobile so that the opening of adjacent car doors or other like objects will impact against the device rather than the automobile body.

The invention provides a panel protector which will not mark the surface of the automobile and which is magnetically held to the exterior thereof, for easy mounting and removal. In the preferred embodiment the protective device is durable and of lightweight construction, and can be conveniently and compactly stored when not in use. The device of the invention can be attached to the automobile when parked, and removed and stored when the car is being driven, so the device can be quite large and therefore very effective at protecting the door and side panels of the car against impacts.

In the preferred embodiment the device provides means for locking the device to the automobile to resist theft.

The invention thus provides a removable protective device for protecting an automobile panel, comprising a protective element comprising a resilient body and a mounting mechanism affixed to the body for removably mounting the device to an automobile body.

In a preferred embodiment the protective device comprises a plurality of protective elements, and a flexible connecting element connecting the protective elements such that the protective elements can be longitudinally aligned when extended for mounting, wherein the connecting element determines a maximum spacing between the protective elements when the device is mounted. The device may be mounted to the automobile body by one or more magnets.

BRIEF DESCRIPTION OF THE DRAWINGS

In drawings which illustrate by way of example only a preferred embodiment of the invention.

DETAILED DESCRIPTION OF THE INVENTION

Figure 1:
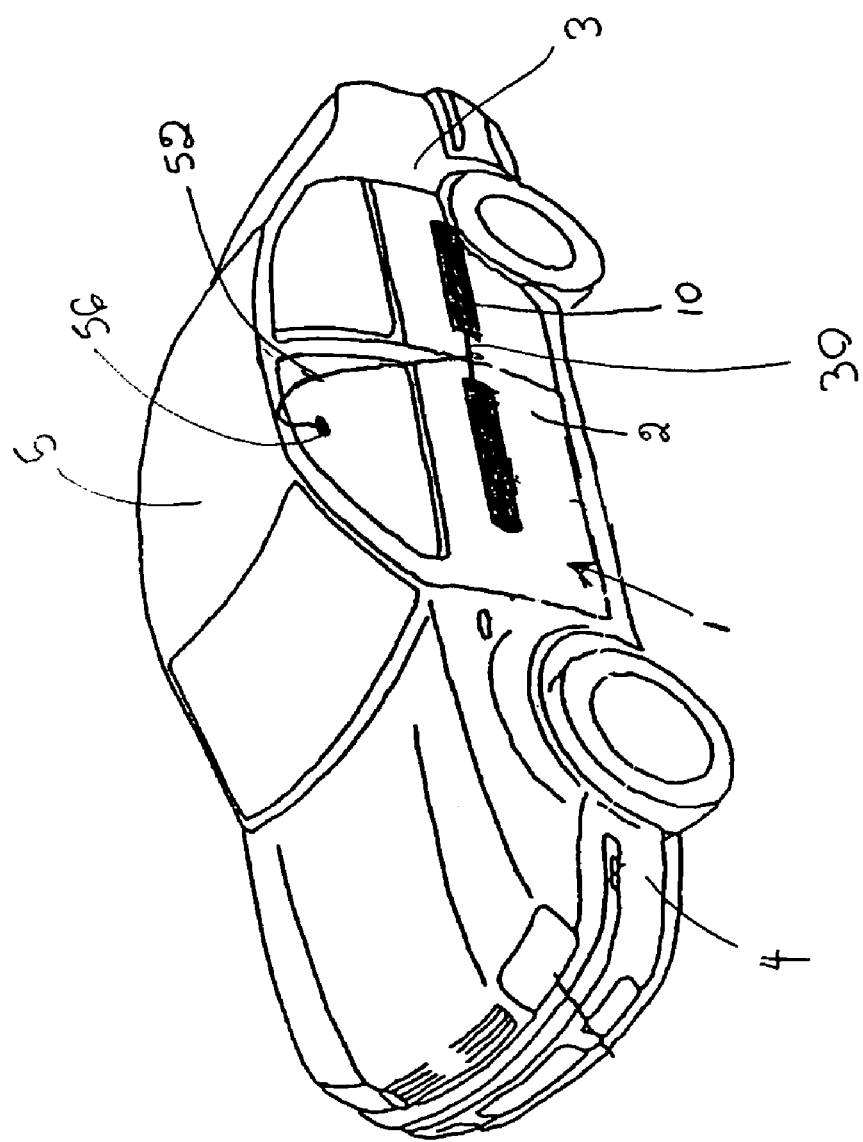
FIG. 1 is a perspective view of an automobile to which a removable protective device of the invention is mounted on the automobile doors.

FIG. 1 illustrates the present invention 10 in use on the body of an automobile 1. The device 10 is shown as used on the doors 2 of the automobile 1, however it will be appreciated that the principles of the invention apply to the use of the device 10 on any part of an automobile body, including the side panels 3, the fender panels 4, and the roof 5 (for example to protect the roof when carrying items on top of the automobile), and on any type of automobile.

The device 10 comprises two protective elements 20. The protective elements 20 are each of sufficient length to extend along the portion of the automobile body desired to be protected, for example substantially between the front and rear wheel wells. Although the illustrated embodiment of the device 10 uses two protective elements 20 of equal size, it will be appreciated by those skilled in the art that the use of a greater or lesser number of protective elements 20 and/or protective elements 20 of different sizes and shapes will equally provide the advantages of the invention.

Figure 3:
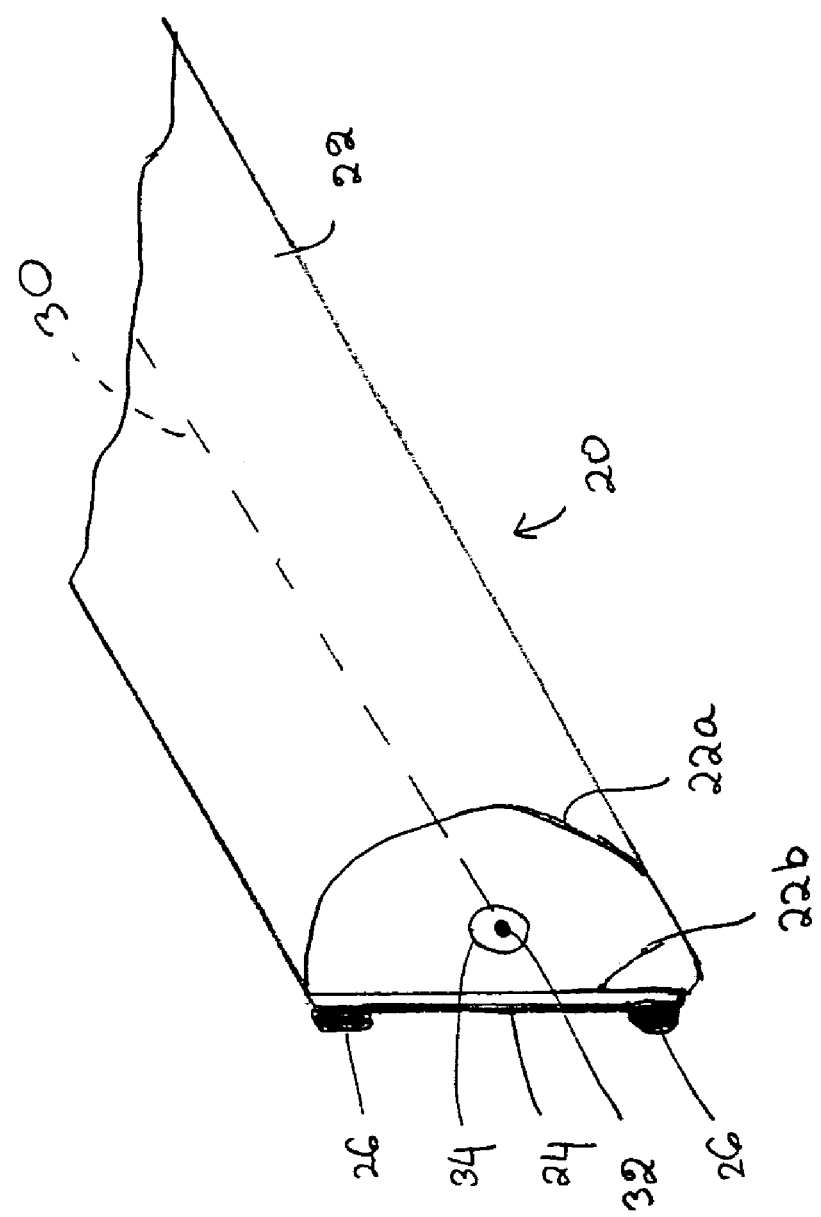
FIG. 3 is a cutaway end elevational view of the device shown in FIG. 1.

FIG. 3 shows a cross-section of the preferred embodiment of the protective element 20. The protective element 20 comprises a resilient body, preferably a high density foam core 22 which functions to retain the shape of the device 1 and to absorb the impact of another automobile door or other object. In the preferred embodiment the foam is moulded or cut to provide a hemi-cylindrical front surface 22a with a flat rear surface 22b. A metal (preferably steel) plate 24 covering the flat rear surface 22b, and serves to absorb the impact of the automobile door so that the metal and foam combine to prevent damage to the exterior finish of the automobile. The plate 24 may be adhered to the foam core 22 by flexible rubberized tape wrapped around the foam core 22 and the metal plate 24 in a sufficient number of locations to secure the metal plate 24 to the flat face 22b of the foam core 22, or may be adhered by adhesive or by any other suitable means.

Figure 6:
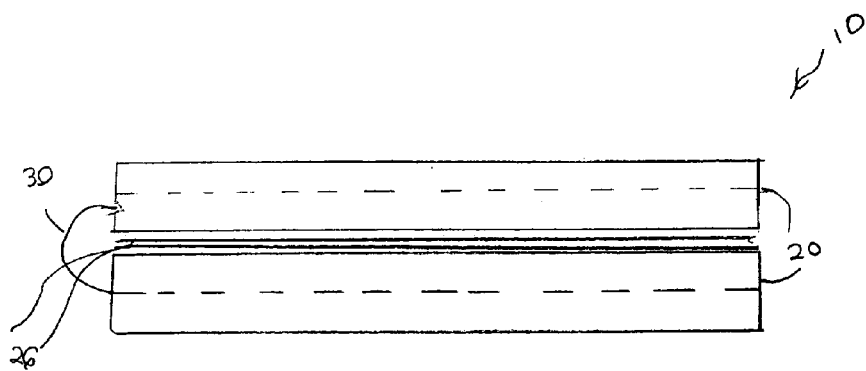
FIG. 6 is a plan view of the device of FIG. 1 in a storage condition.
Figure 7:
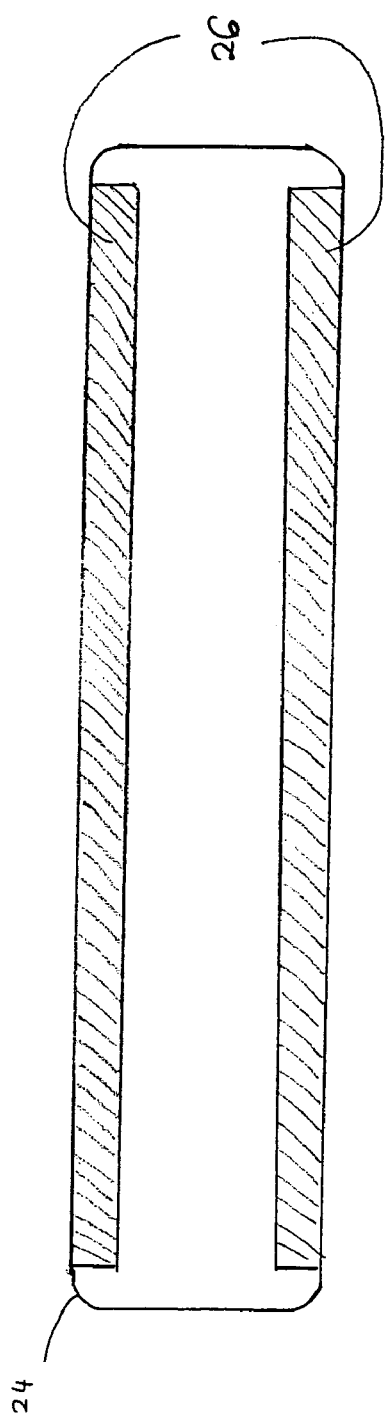
FIG. 7 is a rear elevation of one of the tubes in the device of FIG. 1.

A mounting mechanism in the preferred embodiment comprises magnets 26 disposed along a metal plate 24, as shown in FIG. 7 at a plurality of positions along the protective elements 20. The magnets 26 may be attached to the steel plate 24 by double sided tape, or by any other suitable means. In the preferred embodiment, the magnets 26 are high intensity flexible rare-earth magnets, which allow for a secure removable engagement to the automobile body. The magnets 26 are preferably placed in alternate orientations on the two protective elements 20 (i.e. north pole facing out on one and south pole facing out on the other), so that in the storage condition shown in FIG. 6 the magnets 26 attract rather than repel each other, thereby retaining the protective elements alongside one another. Other mechanism, such as suction cups, may alternatively be used to adhere the protective device 10 to the automobile doors 2.

Figure 2:
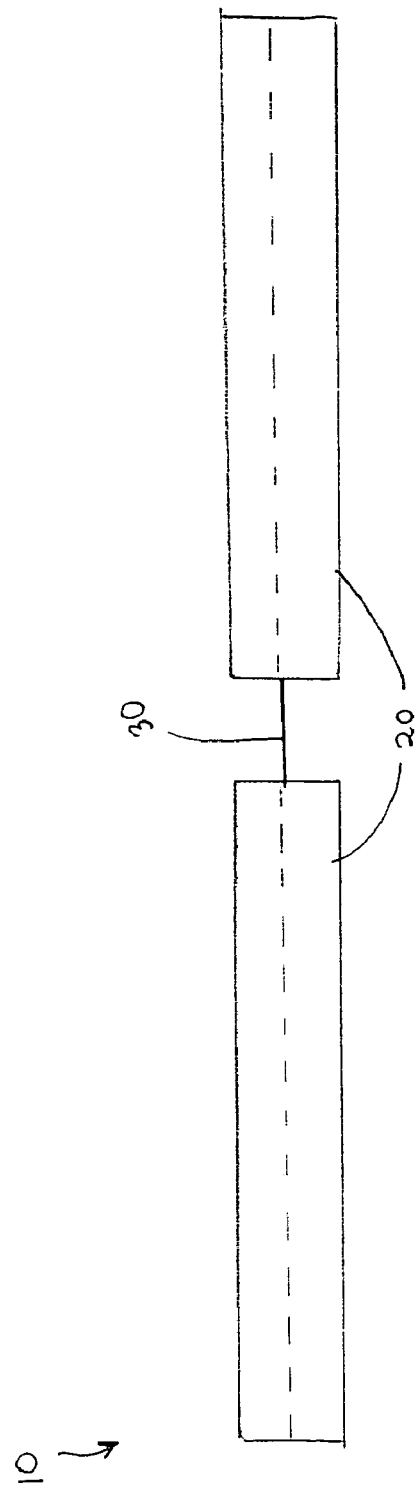
FIG. 2 is a side elevational view of the device shown in FIG. 1.

The foam core 22 may be a foam tube, made to any desired size, which will determine the size of the protective element 20. The two protective elements 20 are connected end-to-end by a flexible connecting element such as a rope 30, as shown in FIGS. 1 to 3, so that they can be longitudinally aligned when extended for mounting to the automobile body, and the connecting element 30 determines the maximum spacing between the protective elements 20 when mounted. The rope 30 extends longitudinally through the foam cores 22 of the protective elements 20, for example being fed through the hollow centres of the cores 22, and is tied in a knot 32 at each end over a washer 34 to prevent the rope 30 from slipping out of the protective elements 20. Alternatively the foam core 22 may be solid, formed over the rope 30, or the rope 30 may be otherwise threaded through the core 22. The rope 30 is cut to a suitable length so that when the device 10 is fully extended and mounted to the automobile, the two protective elements 20 will be spaced so as to attach to the automobile doors 2 or other desired body panels.

Figure 4:
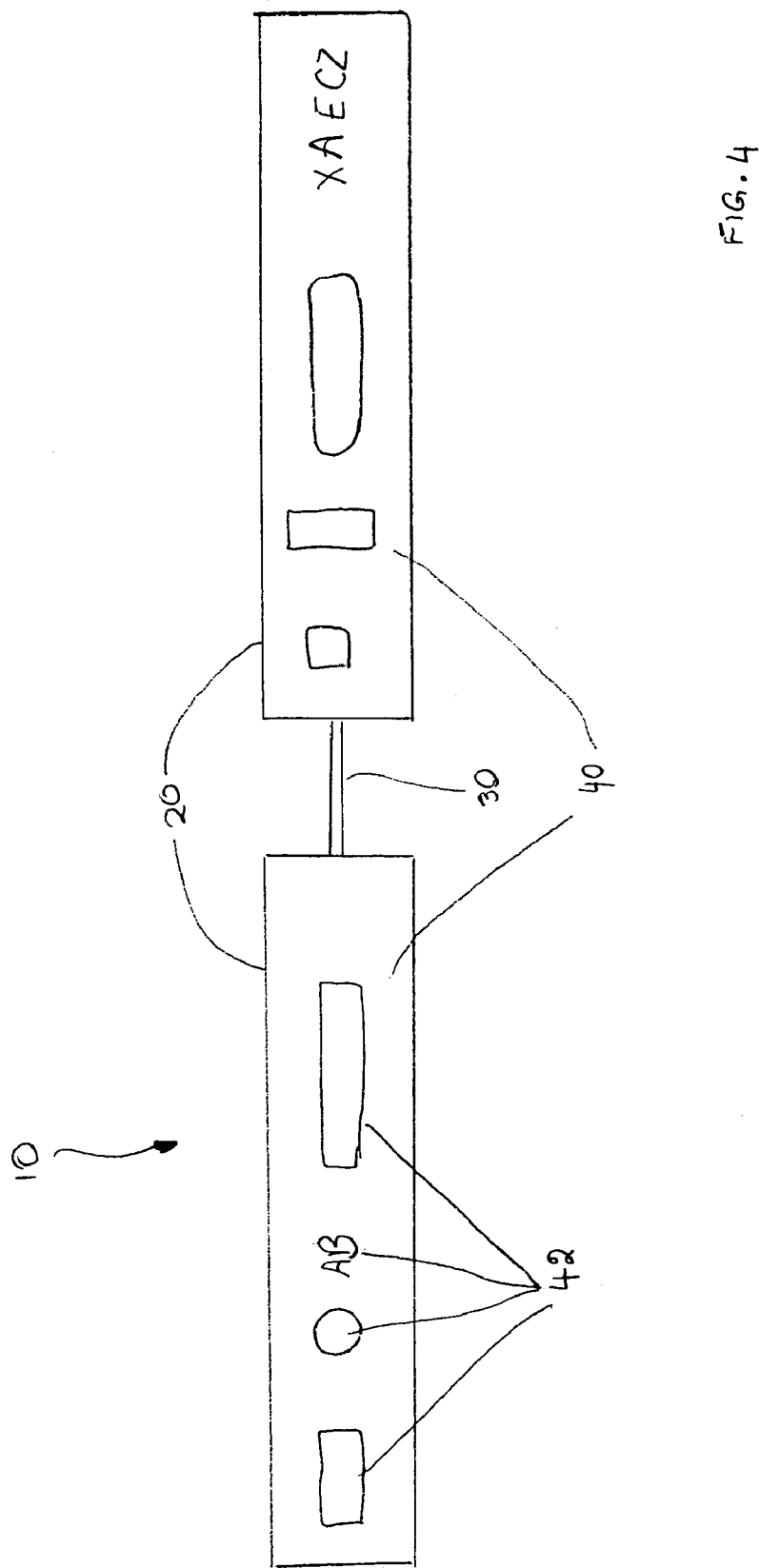
FIG. 4 is side elevational view of an embodiment of the device of the invention bearing advertising indicia.

The protective elements 20 are preferably covered by a suitable fabric sleeve 40, for example composed of nylon. The fabric sleeve 40 protects the exterior surface of the body panel from being scratched by the device 10 itself, and provides some resistance to adverse weather conditions. As shown in FIG. 4, the fabric sleeve 40 also enables the device 10 to function as an advertising medium, by printing advertising indicia 42 on the sleeve 40. Various logos, patches and/or designs may be placed directly onto the fabric sleeve 40. Moreover, the device 10 can be shaped to look like a product, such as a soft drink can, beer can, submarine sandwich, pen, etc., to enhance its promotional function. Also, if formed from a suitable material the sleeve 40 itself may also serve as a connecting element.

Figure 5:
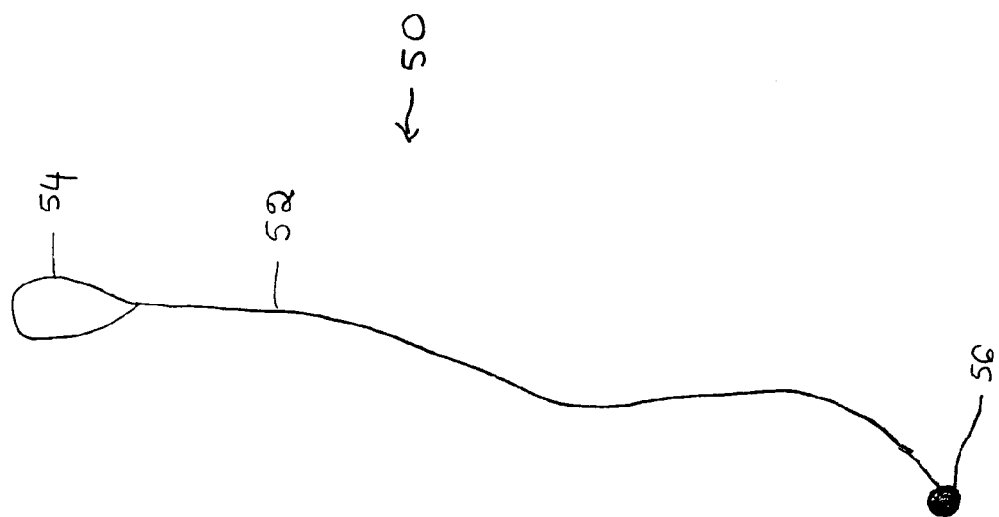
FIG. 5 is an elevation of a security tether for the device of FIG. 1.

In the preferred embodiment the device 10 also has a security tether 50 to resist theft, illustrated in FIG. 5. The security tether 50 consists of a cord 52 with a loop 54 on one end so that it can be attached to the device 10 in the area where the rope 30 is exposed between the two protective elements 20. The other end of the tether cord 52 is enlarged, for example having a plastic ball 56 attached to the cord 52. The end of the tether cord 52 with the ball 56 can thus be placed into the automobile when the door 2 is open, and when the door 2 is closed the tether cord 52 is trapped between the door 2 and the automobile frame. Thus, when the automobile door is closed and locked, the device 10 becomes secured by the security tether 50 because the ball 56 is locked inside the car.

In use, the device 10 is extended and oriented so that the rear of one of the protective elements 20 is facing the automobile body. The one of the protective elements 20 is placed on one of the body panels desired to be protected (for example one of the door panels 2) and is thus removably mounted to the automobile body by magnets 26. One of the automobile doors is opened, the ball of security tether 50 is placed in the automobile, and the door is closed and locked to secure the device 10. The other protective element 20 is then mounted in a similar fashion (for example to the other of the door panels 2). The security tether 50 can also be placed in the automobile after both protective elements 20 have been mounted on the automobile body, since there is sufficient slack in the rope 30 between the protective elements 20 to slightly open the automobile door and place the ball 56 of the security tether 50 inside the automobile.

The protective device 10 is removed from the automobile by first opening the door to free the security tether 50, and then exerting sufficient pulling force to overcome the magnetic attraction of the protective elements 20 to the automobile body. The device 1 can then be folded into the compact configuration as shown in FIG. 6, with the rope 30 acting as a hinge when folding the device 10 and the protective elements 20 held together by oppositely-oriented magnets 26. The device may then be easily and conveniently stored in the automobile.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A removable protective device for protecting an automobile panel, comprising:
    a plurality of protective elements, each comprising
        a resilient body comprising a foam core comprising a flat surface; and
        a mounting mechanism affixed to the body for removably mounting the device to an automobile body, comprising at least one magnet and a metal plate affixed to the magnet and to the flat surface of the foam core; and
    a flexible connecting element extending longitudinally through the core and connecting the protective elements such that the protective elements can be longitudinally aligned when extended for mounting, wherein the connecting element determines a maximum spacing between the protective elements when the device is mounted.

2. The protective device of claim 1 wherein the foam core comprises a foam tube.

3. The protective device of claim 1 wherein a security tether having an enlarged end is affixed to the device to resist theft of the device by locking the enlarged end inside the automobile.

4. The protective device of claim 3 wherein the enlarged end comprises an object affixed to the tether.

5. The protective device of claim 4 wherein the tether is attached to a portion of the connecting element between adjacent protective elements.

6. The protective device of claim 1 wherein each protective element is covered by a fabric sleeve.

* * * * *